(12) United States Patent
Lisch et al.

(10) Patent No.: US 10,987,850 B2
(45) Date of Patent: Apr. 27, 2021

(54) NOZZLE PISTON AND METHOD OF OPERATING SAID NOZZLE PISTON

(71) Applicant: DISCMA AG, Zürich (CH)

(72) Inventors: G. David Lisch, Jackson, MI (US); Frederick C. Beuerle, Jackson, MI (US)

(73) Assignee: DISCMA AG, Zürich (CH)

( * ) Notice: Subject to any disclaimer, the term of this patent is extended or adjusted under 35 U.S.C. 154(b) by 235 days.

(21) Appl. No.: 15/776,306

(22) PCT Filed: Nov. 16, 2015

(86) PCT No.: PCT/US2015/060822
§ 371 (c)(1),
(2) Date: May 15, 2018

(87) PCT Pub. No.: WO2017/086909
PCT Pub. Date: May 26, 2017

(65) Prior Publication Data
US 2018/0326649 A1    Nov. 15, 2018

(51) Int. Cl.
*B29C 49/58*    (2006.01)
*B29C 49/06*    (2006.01)
*B29C 49/46*    (2006.01)

(52) U.S. Cl.
CPC .............. *B29C 49/58* (2013.01); *B29C 49/06* (2013.01); *B29C 2049/4664* (2013.01); *B29C 2049/5803* (2013.01); *B29C 2049/5813* (2013.01)

(58) Field of Classification Search
CPC ............ B29C 2049/5858; B29C 49/58; B29C 2049/5803; B29C 49/06; B29C 49/783; B29C 2049/465; B29C 2049/5813
See application file for complete search history.

(56) References Cited

U.S. PATENT DOCUMENTS

| 9,579,841 | B2* | 2/2017 | Morikami | ............... B29C 49/12 |
| 2014/0300035 | A1* | 10/2014 | Eberle | ................ B29C 49/0073 264/529 |
| 2015/0076105 | A1* | 3/2015 | Sato | ........................ B29C 49/78 215/381 |

FOREIGN PATENT DOCUMENTS

| WO | 2014/191515 A1 | 12/2014 |
| WO | 2014/209341 A1 | 12/2014 |

* cited by examiner

*Primary Examiner* — Jacob T Minskey
*Assistant Examiner* — Adrien J Bernard
(74) *Attorney, Agent, or Firm* — Eric J. Sosenko; Jonathan P. O'Brien; Hongiman LLP

(57) ABSTRACT

A molding system for hydraulic blow molding of a container from a preform. The molding includes a pressurization unit that is configured to receive liquid molding medium from a source; a fill head unit coupled to the pressurization unit to receive the liquid molding medium therefrom; a mold assembly defining a mold cavity in the shape of the container. During forming of the container, a nozzle piston is moved from a retracted position to an extending position where the nozzle piston is engaged to inject the molding medium into the preform, thereby forming and filling the container. The fill head unit defines a receiving chamber for the liquid molding medium that maintains a constant volume during movement of the nozzle piston between the retracted and extended positions.

16 Claims, 4 Drawing Sheets

NOZZLE PISTON AND METHOD OF OPERATING SAID NOZZLE PISTON

BACKGROUND

The present invention generally relates to the molding of plastic containers from preforms. More particularly, the invention relates to a nozzle piston used in a hydraulic blow molding process to form plastic containers.

Plastic containers are commonly used for packaging of products, particularly liquid products (including viscous products). One common plastic container is the blow molded plastic container, which is often formed of a polyester material, such as polyethylene terephthalate (PET). Blow molded plastic containers are typically formed by placing a heated preform into a blow mold and blowing air into the preform to inflate the preform until it contacts the interior surfaces of a cavity mold, which define the final shape of the desired container. The inflated preform is held against the interior surfaces by the air for a length of time that is sufficient to "freeze" the plastic and allow the blow molded container to be removed from the mold.

The blow molded containers are then filled with the final product. This step may include packaging and shipping the containers to a remote, off-site location or may involve the transfer of the containers to another location within the same facility where these final steps are performed. Finally, the container is capped, labeled and shipped to a retailer or end-user.

With the above method, blow molding and filling are distinct and separate steps in the process of producing a product filled container. A more recent process uses a liquid to mold the container. Instead of utilizing air as a blowing medium, this new process utilizes the liquid product that is to be packaged in the container as the container's molding medium. This type of molding is referred to herein as hydraulic blow molding.

During hydraulic blow molding, liquid molding medium continuously resides within the fill head unit, both partly surrounding the nozzle assembly and filling a central cavity within the nozzle piston of the nozzle assembly. Prior to injection of the liquid molding medium, an inlet valve of a pressurization mechanism is closed to constrain the molding medium within the system. Next, the nozzle assembly is lowered to sealing engage the preform and/or the mold assembly, within which the body of the preform is suspended. As the nozzle assembly is opened, the molding medium is pressurized by the pressurization mechanism to rapidly increase the pressure within the system and inject the liquid molding medium from the outlet of the nozzle piston into the preform. The discharging of the liquid molding medium into the preform rapidly expands the preform into conformity with the inner surfaces of the mold defining the shape of cavity and simultaneously fills the resultant container with the desired product.

In forming containers with a liquid molding medium, gas entrained with the molding medium can impact the quality of the resulting container by not sufficiently impressing the plastic of the expanded preform against the cavity surfaces of the mold.

SUMMARY

In overcoming the various drawbacks and limitations of the known technology, in one aspect of the invention a system is provided for the hydraulic blow molding of high quality containers from plastic preforms. To this end, the system incorporates a nozzle assembly having a nozzle piston design that maintains a constant volume, in the area receiving the molding medium, while the nozzle piston is moved from its retracted position to its extended position. This maintains the molding medium at the system pressure and avoids possible cavitation of the molding medium.

In another aspect, the molding system for the hydraulic blow molding of a container from a preform is provided with a pressurization unit that is configured to receive liquid molding medium from a source; a fill head unit coupled to the pressurization unit to receive the liquid molding medium; a mold assembly having mold halves that define a mold cavity in the shape of the container and which is configured to receive the preform therein, wherein the fill head unit is moveable to engage at least one of the mold assembly and the preform; the fill head unit including a housing, a nozzle piston and a seal pin, wherein the nozzle piston is received within a bore of the housing and is moveable with the bore between retracted and extended positions, the seal pin being slideably received within the nozzle piston for movement between an opened position and a closed position in which an outlet of the nozzle piston is closed off by the seal pin, the nozzle assembly further has a receiving chamber coupled to the pressurization unit to receive the molding medium and which has a constant volume during movement of the nozzle piston between the retracted and extended positions.

In a further aspect of the invention, a leading head of the nozzle piston sealingly engages the bore of the housing.

In an additional aspect of the invention, the nozzle piston further includes a trailing head that also sealingly engages the bore of the housing.

In still another aspect of the invention, the trailing head is spaced apart from the leading head along the nozzle piston.

In yet a further aspect of the invention, the leading head and the trailing head are connected by a shank of the nozzle piston, and the shank is provided with a diameter that is less than diameters of the leading head and the trailing head. The reduced diameter of the shank between the larger diameters of the leading and trailing heads enables the receiving chamber to be defined on three of four sides by the nozzle piston.

In an additional aspect of the invention, the receiving chamber is defined between the leading head and the trailing head.

In yet another aspect of the invention, the receiving chamber is defined by a recess formed in the nozzle piston.

In still a further aspect of the invention, the receiving chamber discreetly moves with movement of the nozzle piston between the retracted and extended positions. By moving the chamber with the nozzle piston, the chamber is neither expanded nor contracted as the nozzle piston is advanced or retracted.

In an additional aspect of the invention, the recess extends circumferentially around the shank.

In another aspect of the invention, a method of operating a molding system for the hydraulic blow molding of a container from a preform is provided. The method of operating the molding system comprises the steps of: providing a molding medium in liquid form to the fill head unit; filling a receiving chamber with the fill head unit with the molding medium; advancing a nozzle piston of the fill head unit from a retracted position to an extended position where the nozzle piston engages at least one of the preform or a mold assembly; injecting the molding medium through the nozzle piston into the preform causing the preform to expand into the shape of the container under the influence of the molding medium; and wherein the method is characterized by the step of: maintaining the volume of the receiving chamber constant during advancement of the nozzle piston from the retracted position to the extended position and injection of the molding medium. This maintains the molding medium at the system pressure, avoids possible cavitation of the molding medium and limits any resistance to movement of the nozzle piston that might be induced by the molding medium at a reduced pressure.

Further objects, features and advantages of this invention will become readily apparent to persons skilled in the art after a review of the following description, with reference to the drawings and claims that are appended to and form a part of this specification.

DETAILED DESCRIPTION

Figure 1:
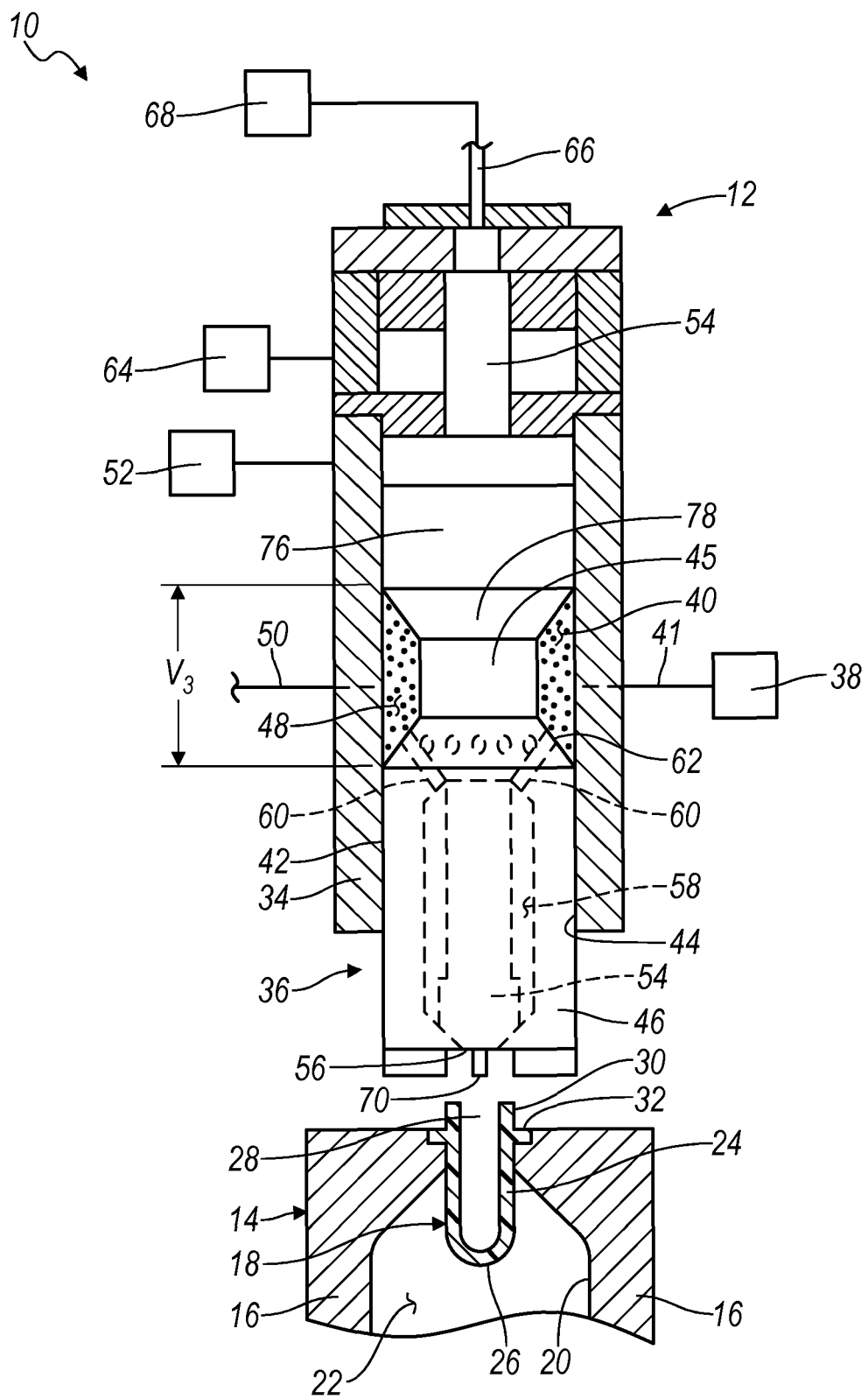
FIG. 1 is a sectional view of a hydraulic blow molding system embodying the principles of the present invention and illustrating the nozzle piston in its retracted position.
Figure 2:
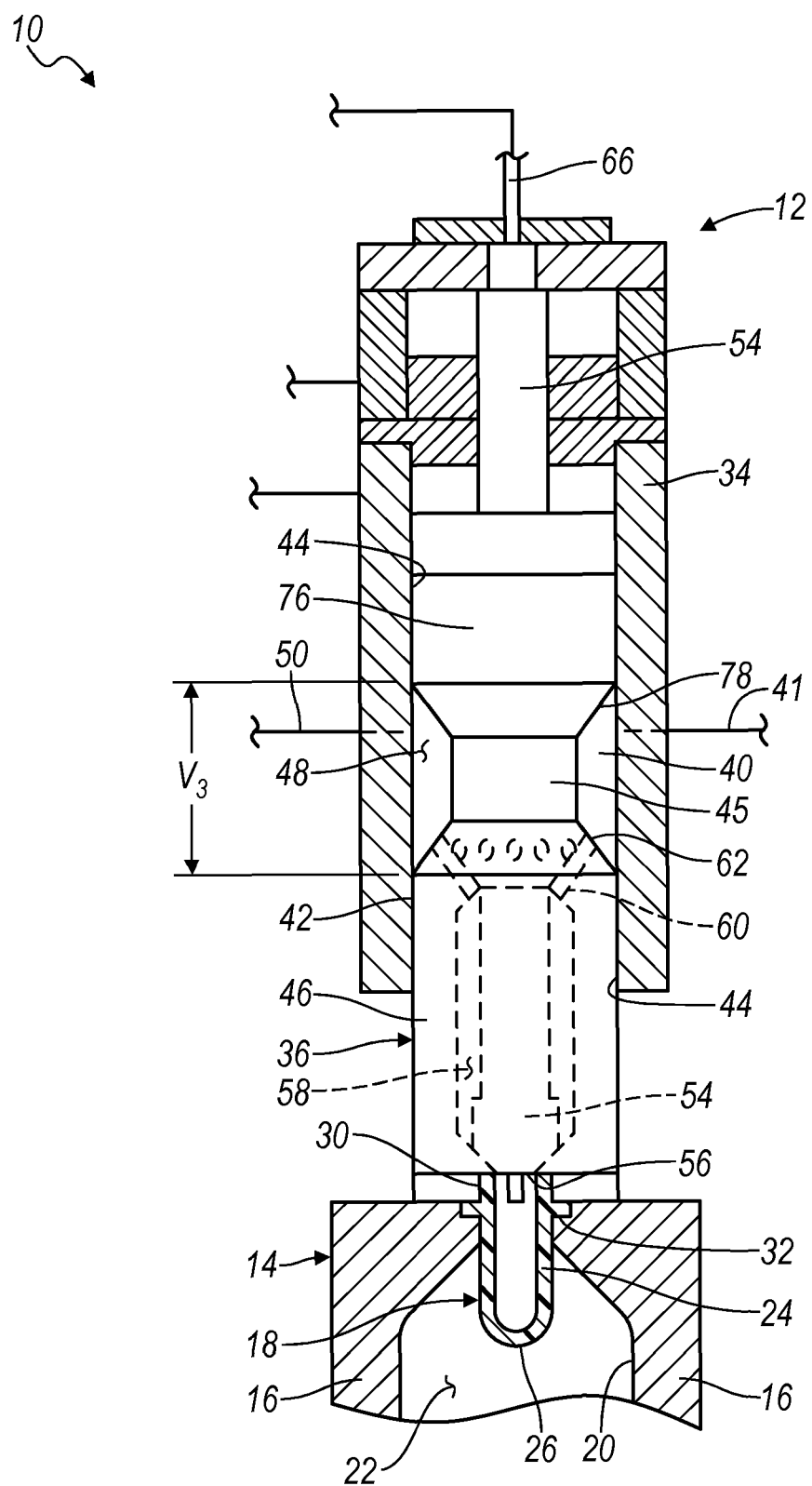
FIG. 2 is a sectional view of the system seen in FIG. 1, but with the nozzle piston in its extended position where it engages the preform and/or mold assembly, just prior to injection of the liquid molding medium into the preform.

Referring now to the drawings, illustrated in the FIGS. 1 and 2 is a hydraulic blow molding system incorporating the principles of the present invention, and which is generally designated and referred to as molding system 10. As mentioned above, hydraulic blow molding uses a liquid as the molding medium. As the term is used herein, liquid is intended to include not only those liquids with a viscosity near water (e.g. beverages and non-beverages, including water, sports drinks, tea, etc.), but also those liquids with a viscosity substantially greater than water and which are generally referred to as viscous liquids (e.g. condiments and household products, including ketchup, dishwashing liquid, etc.). As its primary components, the molding system 10 includes a fill head unit 12 that operates in conjunction with a mold assembly 14 and a pressurization unit 38.

The mold assembly 14 generally includes a pair of mold halves 16 that are hinged or otherwise connected so as to open and close, thereby allowing a preform 18 to be received therein. The mold halves 16 each have interior surfaces 20 that cooperate to define a mold cavity 22, which itself defines the shape of the resultant container (not shown) formed by the molding system 10.

The preform 18 is generally formed as an elongated tubular body 24 bounded by and extending between a closed end 26 and an open end 28. Adjacent to the open end 28 are a finish 30, which may be threaded, and a handling ring 32, which respectively receives a closure cap (not shown) and assists in the handling of the preform 18 and resultant container.

The fill head unit 12 is generally comprised of a housing 34 and a nozzle assembly 36. The molding medium 40, which is also the end product packaged in the resultant container, is provided to the pressurization unit 38 from a source (not shown) and from the pressurization unit 38, through an inlet 41 in the housing 34, to the nozzle assembly 36. The nozzle assembly 36 in turn injects the molding medium 40 into the preform 18 causing the preform 18 to be expanded, axially and radially, into conformity with the interior surfaces 20 defining the cavity 22.

More specifically, the nozzle assembly 36 includes a nozzle piston 42 slideably received within a bore 44, preferably defined by a cylindrical side wall extending longitudinally within the housing 34. Extending from a shank 45 of the nozzle piston 42 is an enlarged portion or head 46. The head 46 is in surface-to-surface sealing engagement with the bore 44 and results in a receiving chamber 48 being defined within the housing 34, between the bore 44 and shank 45. The previously mentioned molding medium 40 is provided into this receiving chamber 48 from the pressurization unit 38. Optionally, the molding medium 40 may be continuously circulated through the receiving chamber 48 via an outlet 50, also provided through the housing 34, so as to better regulate the temperature of the blowing medium 40.

During operation, the molding system 10 begins a molding cycle with the nozzle assembly 36 in a retracted position, retracted by its associated actuator 52, where it is disengaged from the preform 18. This actuator 52, and the other actuators discussed herein, may be any of the well-known types of actuators used for this purpose. Additionally, a seal pin 54, shown in phantom, is in a closed position within the nozzle piston 42 and sealingly engages the nozzle piston 42 at an outlet 56 thereof preventing the discharging of the blowing medium 40 through the outlet 56. The molding medium 40 is provided from the receiving chamber 48 into a discharge chamber 58 defined in the head 46 of the nozzle piston 42 and in communication with the outlet 56. To provide the molding medium 40 from the receiving chamber 48 to the discharge chamber 58, a series of ports 60 are formed through the wall of the nozzle piston 42, in a transition portion 62 between the shank 45 and the head 46. The ports 60 are preferably equidistantly spaced about transition portion 62 of the nozzle piston 42.

The seal pin 54 is slidable received within the nozzle piston 42 and its movement is effectuated by an actuator 64. This sliding movement operates to reciprocate the seal pin 54 between a closed position and an opened position, the closed position being shown in the various figures. In the closed position, and as noted above, the end of the seal pin 54 engages the nozzle piston 42 to close off the outlet 58. A stretch rod 66 may be provided as part of the nozzle assembly 36 so as to extend through the seal pin 54 and move between a retracted position and an extended position, which is effectuated by another actuator 68. In its extended position, the stretch rod 66 is advanced such that the tip 70 of the stretch rod 66 extends into the body 24 of the preform 18.

The pressurization unit 38 may be any means by which the molding medium 40 can be pressurized during molding. As such, the pressurization unit 38 may be a high-pressure pump, a piston and cylinder arrangement, or any other mechanism/arrangement that will allow the pressure of the molding medium 40 to be increased to a pressure suitable for molding of the preform 18 into a container.

Once the pressurization unit 38, receiving chamber 48 and discharge chamber 58 have been filled with the molding medium 40, an inlet valve (not shown) to the pressurization unit 38 is closed, constraining the molding medium 40 within the fill head unit 12. Generally around the time that the inlet valve is closed, the nozzle piston 42 and seal pin 54 are advanced together such that the end of the nozzle piston 42 engages with the upper surfaces of the preform 18 and/or the upper surfaces of the mold assembly 14.

Figure 3:
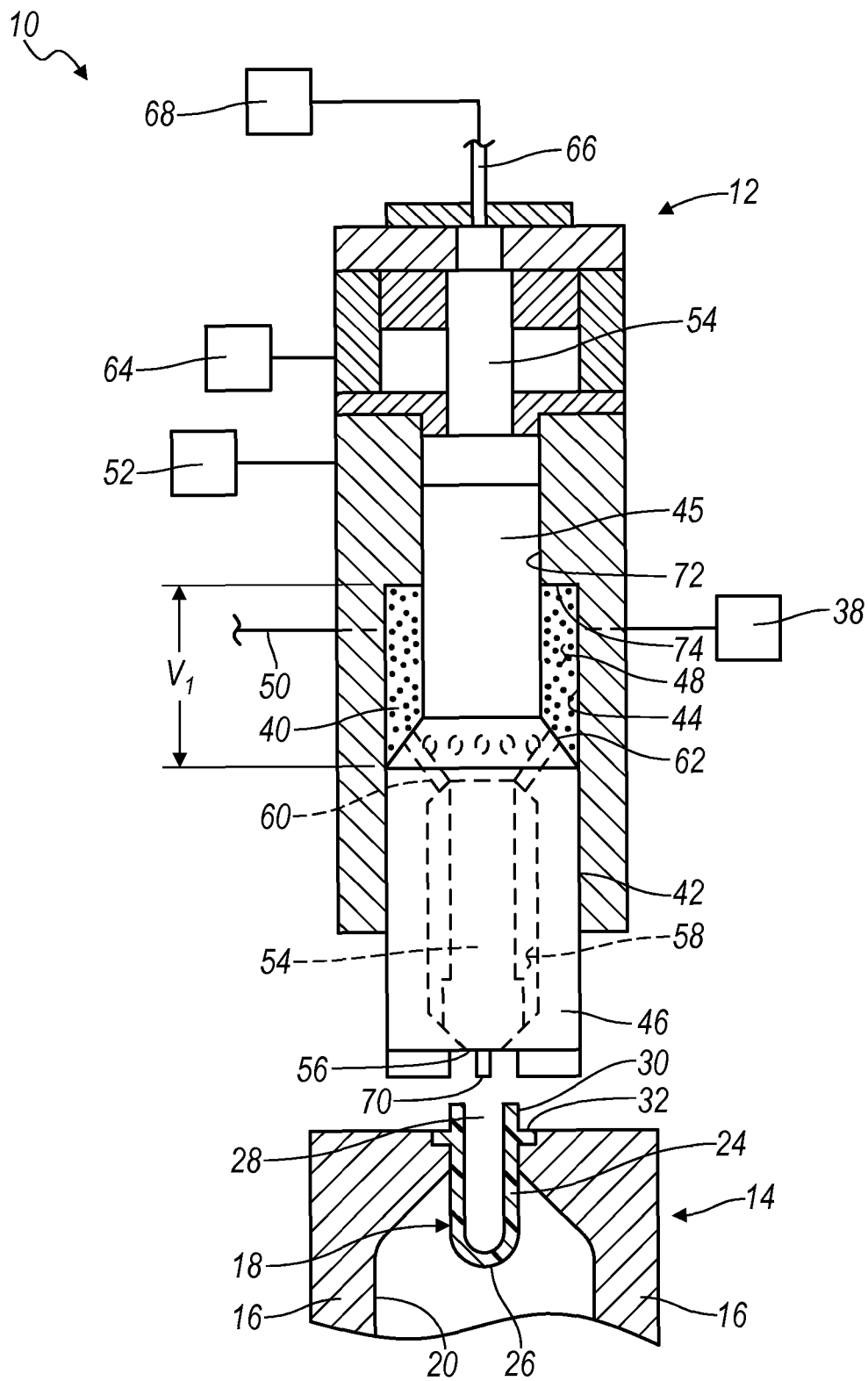
FIG. 3 is a sectional view of a known system for the hydraulic blow molding of a container and shows the nozzle piston in its retracted position.
Figure 4:
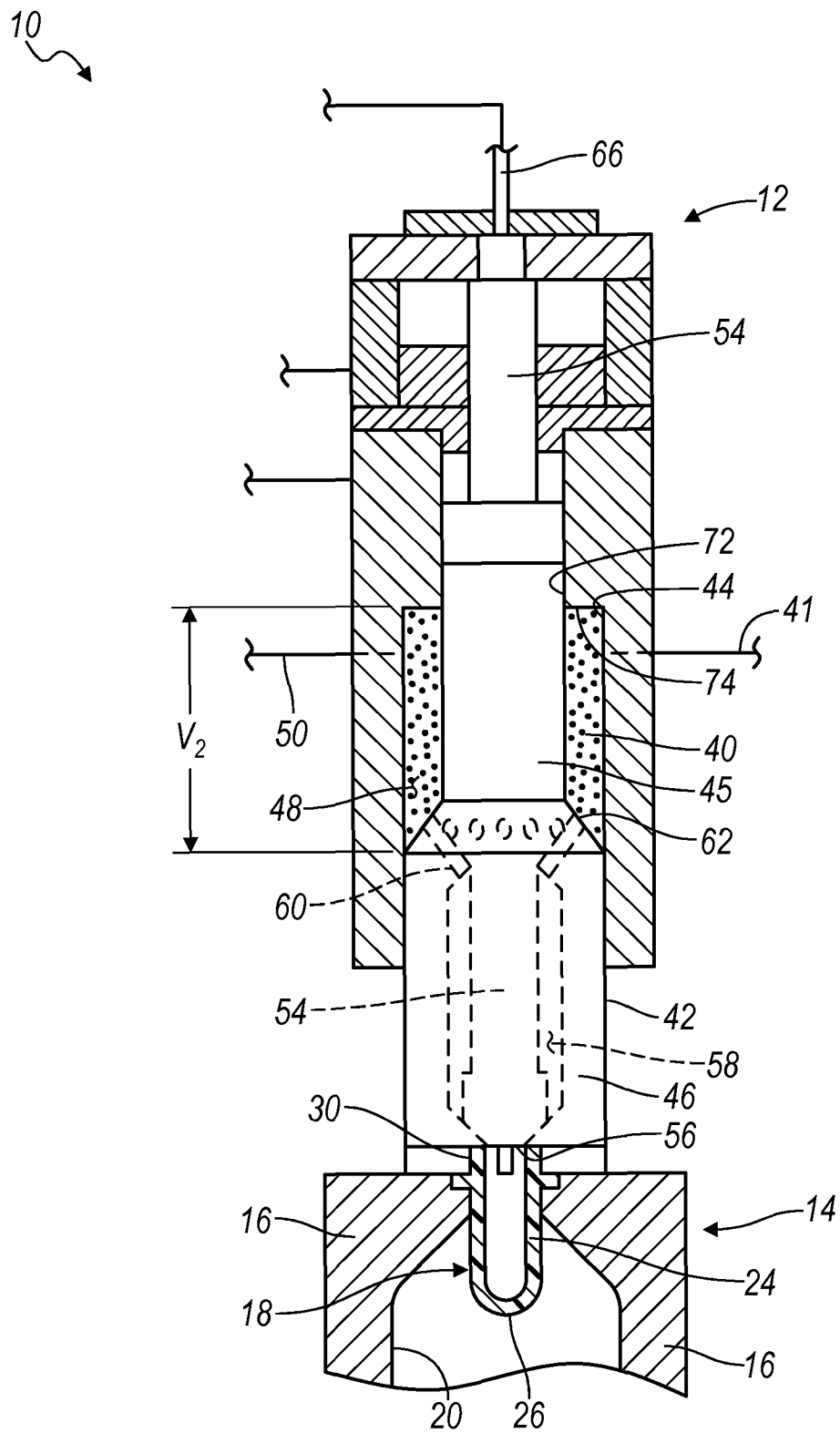
FIG. 4 a sectional view of the system seen in FIG. 3, but with the nozzle piston in its extended position where it engages the preform and/or mold assembly, just prior to injection of the liquid molding medium into the preform.

The features of the molding system 10 according to the present invention, as thus far described, are generally conventional and commonly provided in known constructions. One such known construction is illustrated in FIGS. 3 and 4 and the above discussion is equally applicable to those figures. Accordingly, like reference numerals are used in connection with FIGS. 3 and 4.

Referring further to FIGS. 3 and 4, the receiving chamber 48 is an area about the shank 45 of the nozzle piston 42. The shank 45 extends into and through a reduced diameter bore 72 defined longitudinally through the housing 34, coaxially with the bore 44, and which functions to facilitate the advancing and retracting of the nozzle piston 42. The reduced diameter bore 72 merges with the bore 44 defining the receiving chamber 48 at an axially facing end wall 74 of the receiving chamber 48. With the nozzle piston 42 in its retracted position, seen FIG. 3, the receiving chamber 48 is axially defined between the end wall 74 and the transition portion 62 and has a first volume ($V_1$), which designated in FIG. 3.

As the nozzle assembly 36 is extended or advanced, as seen in FIG. 4, the receiving chamber 48 increases in length as the transition portion 62 moves farther from the end wall 74, resulting in the receiving chamber defining a second volume ($V_2$) that is increased relative to the first volume ($V_1$). With the molding medium 40 within the fill head unit 12 and the pressurization unit 40 being constrained, at one end by the closed inlet valve (not shown) and at the other end by the closed seal pin 54, the pressure of the constrained molding medium 40 is reduced and the molding medium 40 is subjected to a partial vacuum. As a result of the reduction in pressure, the molding medium 40 may experience cavitation and the advancement of the nozzle assembly 36 may be impeded due to restrictions imposed by the molding medium 40. Each of these factors, as well as other factors resulting from the increased volume and reduced pressure, can result in poor formation of the resulting container.

To overcome these drawbacks, a fill head unit incorporating the principles of the present invention has a receiving chamber that does not vary in volume as the nozzle assembly is advanced, or retracted, during the hydraulic blow molding cycle. The fill head unit 12 of FIGS. 1 and 2 incorporates these principles.

Referring now to FIGS. 1 and 2, as seen therein, the receiving chamber 48 is defined by exterior surfaces of the nozzle piston 42 and only one surface of the housing 34, namely the cylindrical surface defining the bore 44. In this regard, the nozzle piston 42 is further formed with a second enlarged portion or head 76 that sealingly engages the bore 44. This second head 76 is provided on an end of the shank 45 opposite from the previously mentioned head 46. Thus, the shank 45 has a diameter that is less than diameters of either the two heads 46, 76. To avoid confusion when referring to the two heads 46, 76 of the nozzle piston 42, the former head 46, the head 46 within which the discharge chamber 58 is defined, is hereinafter referred to as the leading head 46. The latter head 76, by corollary, is hereinafter referred to as the trailing head 76. Similar to the formation of the leading head 46, a trailing transition portion 78 defines the transition from the shank 45 to the trailing head 76. The transition portion 78 is illustrated as being formed by a conical surface, but may be formed by differently shaped surfaces including a wall defining a plane orthogonal to the central axis of the shank 45. For example, the trailing transition portion 78 may be formed as a wall extending radially from the shank 45.

Constructed in this manner, the receiving chamber 48 is a recess formed in the nozzle piston 42 and defined by the cylindrical inner surface of the bore 44 of the housing 34 and exterior surfaces of the nozzle piston 42 between the leading and trailing heads 46, 76. In the illustrated construction, these exterior surfaces of the nozzle piston 42 are the surfaces of the leading and trailing transition portions 62, 78 and the surface of the shank 45. Since the surfaces of the nozzle piston 42 that define the receiving chamber 48 move with the nozzle piston 42 as it is advanced and retracted during the hydraulic blow molding cycle, the receiving chamber 48 discreetly moves within the housing 34 with the nozzle piston 42. In other words, the receiving chamber 48 as a whole moves with the nozzle piston 42 and is fixed in its position relative the nozzle piston 42. As denoted in FIGS. 1 and 2, the volume ($V_3$) defined by the receiving chamber 48 is the same at the retracted position of FIG. 1, the extended position of FIG. 2 and the positions in between. The molding medium 40 in the receiving chamber 48 does not experience a reduction in pressure during movement of the nozzle piston 42 and, as a result, cavitation and other related issues are eliminated.

Once the nozzle assembly 36 is engaged with the preform 18 and/or the mold assembly 14, the seal pin 54 is retracted and disengaged from the outlet 56 of the nozzle piston 42. Generally at the same time, the pressurization unit 38 increases the pressure within fill head unit 12 causing the molding medium 40 to be injected into the preform 18, simultaneously forming and filling the resulting container.

Once the resultant container has been formed and filled, the seal pin 54 is extended and again moved into its closed position. The nozzle assembly 36 is then retracted in the field container can be removed from the mold assembly 14. Upon transferring of a new preform 18 into the mold assembly, they hydraulic blow molding cycle is ready to repeat.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A molding system for hydraulic blow molding of a container from a preform, the molding system comprising:
   a pressurization unit that is configured to receive liquid molding medium from a source;
   a fill head unit coupled to the pressurization unit to receive the liquid molding medium therefrom;
   a mold assembly having mold halves defining a mold cavity in the shape of the container, the mold assembly being configured to receive the preform therein, wherein the fill head unit is moveable to engage at least one of the mold assembly and the preform; and
   the fill head unit including a housing, a nozzle piston and a seal pin, the nozzle piston being moveably received within a bore of the housing and being moveable within the bore between retracted being disengaged from the mold assembly or preform and extended position engaged with the mold assembly or preform, the seal pin being slideably received within the nozzle piston for movement between an opened position and a closed position, in the closed position an outlet of the nozzle piston being closed off by the seal pin, the nozzle piston further defining a receiving chamber located between the nozzle piston and the housing that is coupled to the pressurization unit to receive the molding medium, the receiving chamber having a constant volume during movement of the nozzle piston between the retracted and extended positions within the housing, in the open position the outlet of the nozzle piston being unobstructed by the seal pin and in fluid communication with the receiving chamber, the nozzle piston further including a leading head in liquid sealing engagement with the bore of the housing during movement of the nozzle piston between the retracted and extended positions.

2. The molding system according to claim 1, wherein the nozzle piston further includes a trailing head, the trailing head being in liquid sealing engagement with the bore of the housing.

3. The molding system according to claim 2, wherein the trailing head is spaced apart from the leading head along a length of the nozzle piston.

4. The molding system according to claim 2, wherein the leading head and the trailing head are connected by a shank of the nozzle piston, the shank having a diameter that is less than diameters of the leading head and the trailing head.

5. The molding system according to claim 2, wherein the receiving chamber is defined between the leading head and the trailing head.

6. The molding system according to claim 1, wherein the receiving chamber is defined by a recess formed in the nozzle piston.

7. The molding system according to claim 1, wherein the receiving chamber discreetly moves with movement of the nozzle piston between the retracted and extended positions.

8. The molding system according to claim 7, wherein the recess extends circumferentially around the shank.

9. A method of operating a molding system for hydraulic blow molding of a container from a preform, the molding system including a fill head unit and the method comprising the steps of:
   providing a molding medium in liquid form to the fill head unit;
   filling a receiving chamber within the fill head unit with a volume of the molding medium, the receiving chamber being defined between a housing of the fill head unit and an nozzle piston of the fill head unit;
   advancing the nozzle piston of the fill head unit within a bore of the housing from a retracted positon to an extended position with a leading head of the nozzle piston in fluid sealing engagement with the bore of the housing and to engage the nozzle piston with at least one of the preform or a mold assembly;
   injecting the molding medium from the receiving chamber through an outlet in the leading head of the nozzle piston and into the preform causing the preform to expand into the shape of the container under the influence of the molding medium; and
   maintaining the volume of the receiving chamber constant during advancement of the nozzle piston within the bore of the housing from the retracted position to the extended position and injection of the molding medium.

10. The method of operating a molding system for hydraulic blow molding according to claim 9, wherein the receiving chamber is advanced with the advancing of the nozzle piston.

11. The method of operating a molding system for hydraulic blow molding according to claim 9, wherein the providing of the molding medium to the fill head unit is stopped after the advancing of the nozzle piston.

12. The method of operating a molding system for hydraulic blow molding according to claim 9, wherein the providing of the molding medium to the fill head unit is stopped prior to the advancing of the nozzle piston.

13. The method of operating a molding system for hydraulic blow molding according to claim 9, wherein the providing of the molding medium to the fill head unit is stopped at the time of the advancing of the nozzle piston.

14. The method of operating a molding system for hydraulic blow molding according to claim 9, further comprising the step of retracting a seal pin located within the nozzle piston to open the outlet of the nozzle piston and initiate injection of the molding medium through the nozzle piston into the preform.

15. The method of operating a molding system for hydraulic blow molding according to claim 9, wherein a trailing wall cooperates to partially define the volume of the receiving chamber and is advanced with the nozzle piston to maintain the volume of the receiving chamber.

16. The method of operating a molding system for hydraulic blow molding according to claim 9, wherein the leading head and a trailing wall cooperate to partially define the volume of the receiving chamber and are advanced with the nozzle piston to maintain the volume of the receiving chamber.

* * * * *